Dec. 4, 1962 A. B. EUGA 3,066,768
BRAKE SYSTEM FOR VEHICLES INCORPORATING SEPARATE
SERVICE AND AUXILIARY CIRCUITS
Original Filed Feb. 8, 1956 3 Sheets-Sheet 3

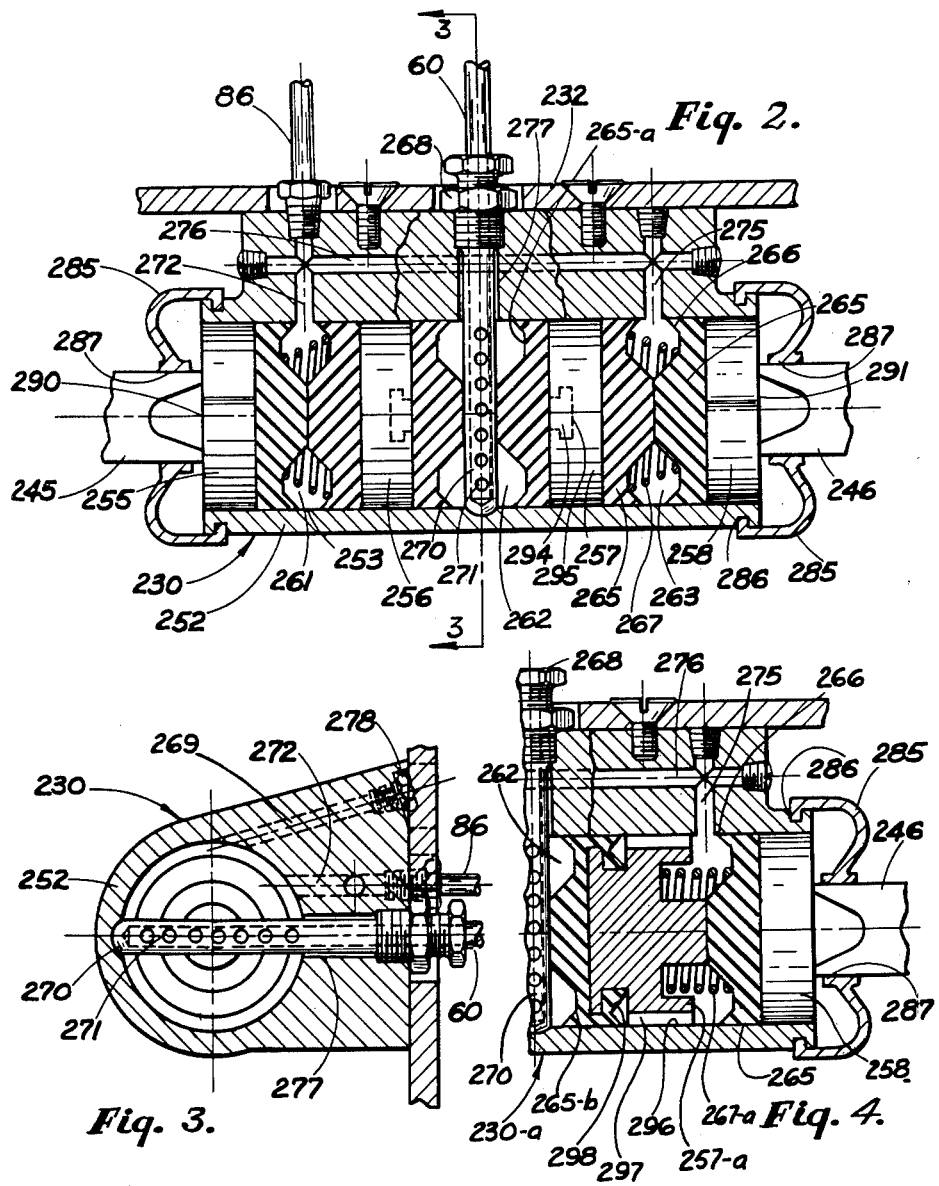

INVENTOR.
ARTHUR B. EUGA
BY
Schmieding and Fultz
ATTORNEYS

United States Patent Office 3,066,768
Patented Dec. 4, 1962

3,066,768
BRAKE SYSTEM FOR VEHICLES INCORPORATING SEPARATE SERVICE AND AUXILIARY CIRCUITS
Arthur B. Euga, 728½ Franklin Ave., Columbus, Ohio
Original application Feb. 8, 1956, Ser. No. 564,315, now Patent No. 2,871,827, dated Feb. 3, 1959. Divided and this application Dec. 30, 1957, Ser. No. 706,193
6 Claims. (Cl. 188—106)

This application relates to braking systems for vehicles of the type wherein auxiliary braking means are provided for actuating the brake mechanisms upon failure of the service braking system of the vehicle.

The present application is a division of my co-pending application Serial No. 564,315, filed February 8, 1956, now Patent No. 2,871,827 which is a continuation-in-part of my co-pending application Serial No. 176,785, filed July 31, 1950, now abandoned, and relates to certain modifications and improvements of the systems disclosed therein.

One object of the invention, therefore, is the provision of a novel means adapatable for instantly supplementing the fluid action of the service braking means upon partial loss of the serving fluid therefor.

Another object of the present invention is the provision of an auxiliary fluid actuated system adaptable for the instant alternative actuation of the braking mechanism upon partial or total failure of the usual fluid actuated service braking means.

Further objects and advantages of the present invention will be apparent from the following description, reference being had to the accompanying drawings wherein preferred forms of embodiments of the invention are clearly shown.

In the drawings:

FIGURE 2 is a top view, partially in section of the wheel cylinder of FIGURE 1 with the section being taken along the line 2—2 of FIGURE 1;

FIGURE 3 is an end view, partially in section, of the wheel cylinder of FIGURE 2, with the section being taken along the line 3—3 of FIGURE 2;

Figure 5:
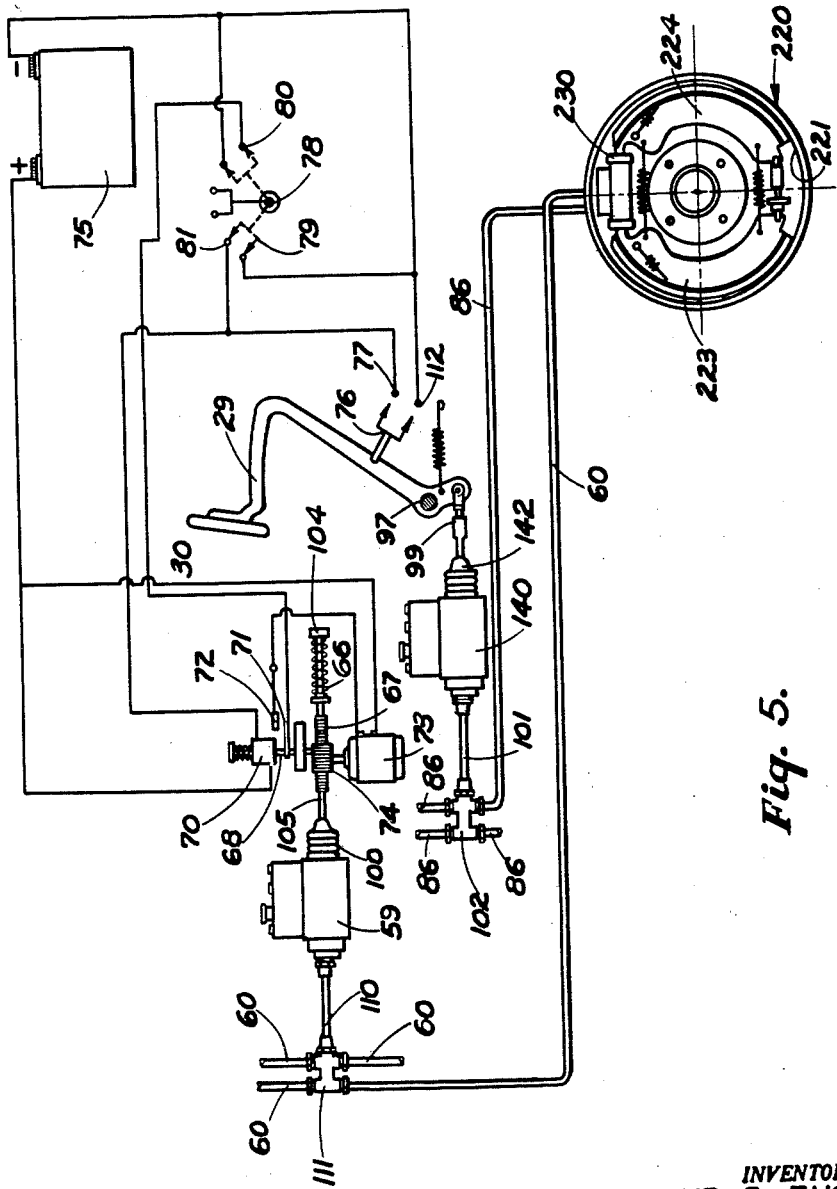

FIGURE 4 is a partial top view, partially in section, showing a modified internal wheel cylinder construction comprising another aspect of the present invention. The section is taken along a horizontal plane passing the longitudinal center line of such wheel cylinder; and FIGURE 5 is a diagrammatic view of a braking system for a vehicle which system is constructed according to the present invention and provided with a novel wheel cylinder construction of the type shown in FIGURE 1 or FIGURE 4.

Figure 1:
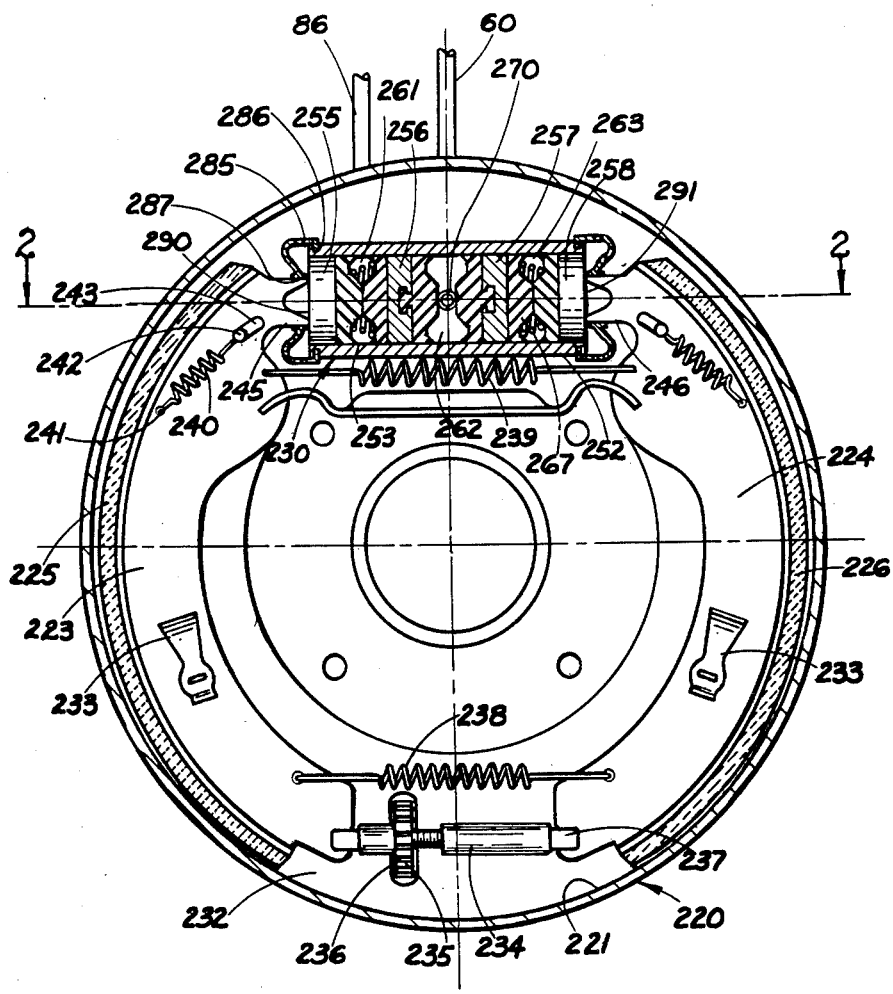
FIGURE 1 is a side elevational view, partially in section, of a brake shoe and drum assembly for a vehicle with such apparatus being provided with a novel wheel cylinder constructed according to the present invention. The section is taken along a vertical plane passing through the longitudinal center line of the wheel cylinder.

Referring in detail to the drawings, FIGURE 1 illustrates a brake drum indicated generally at 220 and provided with an inner peripheral surface 221. Two brake shoes 223 and 224 are movably mounted within drum 220 and provided with linings 225 and 226 which are moved into frictional engagement with surface 221 upon actuation of a wheel cylinder indicated generally at 230.

Each of the shoes 223 and 224 is mounted to a back plate 232 by an anchor pin 242 which is carried by back plate 232 and extended through a slot 243 in the flange of the shoe. A tension spring 240 is connected to anchor pin 242 and to its respective shoe at a hole 241 and serves to urge the shoe upwardly and inwardly as seen in FIGURE 1.

An upper tension spring 239 is connected between the upper portions of shoes 223 and 224 and a lower tension spring 238 is connected between the lower ends of shoes 223 and 224 with such springs serving to normally maintain the shoes inwardly such that the linings 225 and 226 do not normally engage the inner surface 221 of drum 220.

The back plates 232 includes two anti-rattle supports 233 each of which movably supports one of the shoes 223 or 224 for the purpose of preventing same from rattling.

Adjustment of the shoes relative to the drum surface 221 is effected by means of two threaded elements 234 and 235 which elements are coaxially disposed between the lower ends of the shoes and engage same at the tines 237. Threaded element 235 includes a knurled portion which extends outwardly of the drum 220 through the slot 236 to provide means for adjusting the shoes without removing the wheels of the vehicle.

As is best seen in FIGURE 2 the wheel cylinder 230 includes a body member 252 provided with an inner cylindrical surface 253 that slidably carries four pistons 255, 256, 257, and 258 such that the pistons form three separate chambers 261, 262, and 263.

Each of the end chambers 261 and 263 includes two flexible sealing elements, or cups, 265 having confronting faces recessed at 266.

Each of the end chambers 261 and 263 is provided with a spring means 267 operative between the confronting sealing elements 265 to retain the sealing members against the faces of the pistons. The central chamber 262 may be provided with a different type of sealing element 265–a which elements are caused to follow the pistons by integrally formed necked protrusions 294 which snap into conforming recesses 295 in the pistons 256 and 257.

The central chamber 262 also includes a fitting 268 for attaching an intake line 60 to the body member 252. Fitting 268 includes portion 270 extended through hole 277 into center chamber 262 between the seals 265–a which portion serves as a stop for assuring that the pistons and sealing members are under all conditions retained in the centered disposition illustrated. The stop 270 is provided with a plurality of holes 271 which form passages for fluid from line 60 to center chamber 262. Line 60 leads to master cylinder 59 of the auxiliary braking system of FIGURE 5.

As seen in FIGURES 2 and 3 a passage 272 connects outer chamber 261 with a line 86 communicating with master cylinder 140 of the service brake system as shown in FIGURE 5. The other outer chamber 263 communicates with line 86 through connecting passages 275 and 276. With reference to FIGURE 3, the chambers 261, 262 and 263 can be bled of air through passages 269 at removable plugs 278 after the system has been filled with fluid.

Referring again to FIGURE 2, the ends of body member 252 are provided with flexible cover members 285 retained in grooves 286. Central holes 287 through the cover members 285 receive thrust rods 245 and 246 of the brake shoes. Thrust rod 245 of the left shoe 223 is engaged by the outer surface 290 of the left end piston 255 and the other thrust rod 246 is engaged by the outer surface 291 of the right end piston 258.

In operation of the wheel cylinder 230, when master cylinder 140, FIGURE 5, of the service brake system is actuated, pressure is applied to outer chambers 261 and 263 through line 86 and conduits 272, 275, and 276. The two inner pistons 256 and 257 are thereby urged towards each other and against the locater or stop 270. At the same time, the two outer pistons 255 and 258 are moved outwardly in cylinder 253 against thrust rods 245 and 246. The shoes 223 and 224 are thereby moved outwardly whereby the linings 225 and 226 are caused to frictionally engage the inner surface 221 of drum 220.

When the master cylinder 59, FIGURE 5, of the auxiliary braking system is actuated, in the manner described, the central chamber 262 is pressurized by fluid from line 60 whereby pistons 257 and 258 are urged to the right and pistons 255 and 256 are urged to the left. This action forces thrust pins 245 and 246 and shoes 223 and 224 outwardly whereby linings 225 and 226 are caused to frictionally engage the inner surface 221 of drum 220.

It will be understood from FIGURE 1 or 2 that when the service braking system is actuated the left sealing element 265 in chamber 263 and the right sealing element 265 in chamber 261 will prevent fluid from passing to the central chamber 262. When the auxiliary braking system is actuated the left sealing element 265–a in center chamber 262 prevents fluid from passing to the outer chamber 261 of the service brake system and the right sealing element 265–a prevents fluid from passing to the other outer chamber 263 of the service brake system. Hence it is seen that the construction of wheel cylinder 230 completely isolates the fluid circuit of the service brake system from the fluid circuit of the auxiliary brake system.

Reference is next made to FIGURE 5 which consists of a diagrammatic view showing the hydraulic wheel cylinder 230, just described, incorporated in a typical brake system which system includes both a service brake means and an auxiliary brake means. Such system includes an actuating lever 29 pivoted at 97 and mechanically linked to the piston of a conventional master cylinder 140 by means of a push rod 99. A flexible boot 142 may be provided at the entrance of rod 99 into master cylinder 140.

The outlet of master cylinder 140 communicates with a four-way fitting 102 from which the lines 86 each distribute fluid to a wheel cylinder 230 located at one of the wheels of the vehicle. For purposes of description only one of such wheel cylinders is illustrated in FIGURE 5.

With continued reference to FIGURE 5, an auxiliary brake actuating means, such as is described in detail in my co-pending application Serial No. 176,785, now abandoned, is illustrated as a means for operating the hydraulic wheel cylinder 230 of the present invention, it being understood that other auxiliary actuating means can be utilized for supplying fluid through an auxiliary line 60 to the auxiliary chamber 262 of the hydraulic wheel cylinder 230. As seen in FIGURE 5, such an actuating means comprises a coil spring 66 of the compression type which is mounted on frame 104 and connected to a push rod 105. A latch pin 68 serves to latch with push rod 105 for retaining spring 66 in a compressed configuration. A solenoid 70 is provided with its core connected to latch pin 68 whereby the pin can be pulled upwardly, as seen in FIGURE 5, to release push rod 105. The spring 66 will then drive push rod 105 and piston of auxiliary master cylinder 59 to the left, as seen in FIGURE 5 whereby fluid is driven through the outlet line 110 of the auxiliary master cylinder. This section will pressurize the four lines 60 commonly connected to fitting 111, which lines 60 each lead to a wheel cylinder 230 located at one of the wheels of the vehicle.

With continued reference to FIGURE 5, operation of the auxiliary actuating means is instituted automatically when the contacts 77 are bridged to connect the solenoid 70 to battery 75. The conductor 76 mounted on lever 29 serves to bridge the contacts 77 when such pedal moves beyond a predetermined normal limit of travel which limit may be established by the existence of normal pressure in the service brake system, i.e. in the outer chambers 261 and 263 of the wheel cylinder 230. When a leakage of fluid from outer chambers 261 or 263 occurs, and lever 29 is then actuated, the lever 29 will move beyond its normal limit of travel and contacts 77 will be bridged whereby solenoid 70 is energized. The latch pin 68 is thereby pulled out of latched engagement with push rod 105 and spring 66 and auxiliary master cylinder 59 pressurize the fluid in line 60 leading to the central chamber 262 of wheel cylinder 230.

To provide means for resetting the actuating means of the auxiliary system of FIGURE 5 an electric motor 73 is provided with a pinion 74 which engages a rack 67 carried by push rod 105. The motor 73 can thereby drive push rod 105 to the right, as seen in FIGURE 5, and restore potential energy to the spring 66.

In order to operate motor 73 it is necessary that a movable contact 71 be in engagement with a stationary contact 72, which engagement will occur when solenoid 70 is actuated since movable contact 71 is carried on latch pin 68. It is also necessary in order to operate motor 73, that the contacts 80 be manually closed by the conductor 79 of manually actuated switch 78. It will therefore be understood that once the auxiliary brake system has been actuated, it is necessary to manually set the switch 78 to bridge contacts 80 before the motor 73 will become energized to reset the actuating mechanism of the auxiliary system.

It will further be understood from FIGURE 5 that the auxiliary brake means can be manually actuated by switch 78 since bridging of contacts 81 will energize solenoid 70 and release latch pin 68 in the same manner that bridging of contacts 77, by action of lever 29, serves to energize solenoid 70.

Reference is next made to FIGURE 4 which shows a modification of brake cylinder 230 which modification is indicated generally at 230–a. For purposes of description only the right half of modified cylinder 230–a is illustrated since the construction thereof is symmetrical. The structure of cylinder 230–a is identical to that of cylinder 230, previously described, except that a modified inner piston 257–a, modified inner seal 265–b, and modified spring 267–a are utilized. Piston 257–a includes an outer surface 296 grooved to provide passages 297 which connect chamber 266 with an outer surface 298 of sealing element 265–b. When the piston type 257–a is employed, as seen in FIGURE 7, it will be understood that when the central chamber 262 is pressurized the outer surface 296 of piston 257–a will move across the hole at the inner end of passage 275, but the seal member 265–b will never move far enough to have its peripheral sealing edge moved past the hole of passage 275. Hence the central seals 265–b will, under all conditions, be protected from damage.

While the forms of embodiments of the present invention as herein disclosed constitute preferred forms, it is to be understood that other forms might be adopted, all coming within the scope of the claims which follows:

I claim:

1. A braking system for vehicles comprising, in combination, a service fluid system and an auxiliary fluid system, rotatable drum means forming a moveable surface to be arrested by said system; means forming a second surface moveable into frictional engagement with said first surface; a fluid actuated cylinder mounted within said drum means for actuating said second mentioned means; at least three pistons slideably carried in said cylinder, said pistons forming a plurality of sealed motor chambers within said cylinder; connecting means between one of said pistons and said second mentioned means, an end of said one piston and an end of a second of said pistons forming moveable walls of one of said sealed motor chambers, said second piston being disposed between said one sealed motor chamber and a second of said sealed motor chambers; means for pressurizing fluid in the service fluid system which system includes one of said motor chambers, a fluid pressure translating means, and conduit means connecting said fluid pressure translating means with the said one of said motor chambers; actuating means for said fluid pressure translating means; said auxiliary fluid system including auxiliary fluid chamber; a second conduit means connecting said auxiliary fluid system with said second motor chamber; a member movably disposed in said auxiliary fluid chamber in communication with the fluid therein; and means operatively connected to said actuating means for applying force to said movable member to move said member in a direction to pressurize fluid in said auxiliary fluid chamber only in response to any failure of the first mentioned service brake fluid system to produce normal service brake operating pressure during operation of said actuating means in a direction to apply the service brake.

2. A braking system for vehicles comprising, in combination, a service fluid system and an auxiliary fluid system, means forming a moveable surface to be arrested by said system; shoe means forming a second surface moveable into frictional engagement with said first surface; a fluid actuated cylinder for actuating said shoe means; at least three pistons slideably carried in said cylinder, said pistons forming a plurality of sealed motor chambers within said cylinder; connecting means between one of said pistons and said shoe means, an end of said one piston and an end of a second of said pistons forming confines of one of said sealed motor chambers, said second piston being disposed between said one sealed chamber and a second of said sealed motor chambers; means for pressurizing fluid in the service fluid system which system includes one of said motor chambers, a fluid pressure translating means, and conduit means connecting said fluid pressure translating means with the said one of said motor chambers; actuating means for said fluid pressure translating means; said auxiliary fluid system including auxiliary fluid chamber; a second conduit means connecting said auxiliary fluid system with said second motor chamber; a member movably disposed in said auxiliary fluid chamber in communiication with the fluid therein; and means operatively connected to said actuating means for applying force to said movable member to move said member in a direction to pressurize fluid in said auxiliary fluid chamber only in response to any failure of the first mentioned service brake fluid system to produce normal service brake operating pressure during operation of said actuating means in a direction to apply the service brake.

3. A braking system for vehicles comprising, in combination, a service fluid system and an auxiliary fluid system, moveable means to be arrested by said system; shoe means forming a surface moveable into frictional engagement with said first means; a second shoe means forming a second surface moveable into frictional engagement with said first means; a fluid actuated cylinder for actuating said first and second shoe means; at least three pistons slideably carried in said cylinder, said pistons forming a plurality of sealed motor chambers within said cylinder; connecting means between one of said pistons and said first shoe means, an end of said one piston and an end of a second of said pistons forming confines of one of said sealed motor chambers, said second piston being disposed between said one sealed motor chamber and a second of said sealed motor chambers; a second connecting means between a third of said pistons and said second shoe means; means for pressurizing fluid in the service fluid system which system includes one of said motor chambers, a fluid pressure translating means, and conduit means connecting said fluid pressure translating means with the said one of said motor chambers; actuating means for said fluid pressure translating means; said auxiliary fluid system including auxiliary fluid chamber; a second conduit means connecting said auxiliary fluid system with said second motor chamber; a member movably disposed in said auxiliary fluid chamber in communication with the fluid therein; and means operatively connected to said actuating means for applying force to said movable member to move said member in a direction to pressurize fluid in said auxiliary fluid chamber only in response to any failure of the first mentioned service brake fluid system to produce normal service brake operating pressure during operation of said actuating means in a direction to apply the service brake.

4. Mechanism defined in claim 2 that includes means providing a source of potential energy connected to said movable member, means for releasing said potential energy to actuate said movable member, and means for restoring the potential energy to said source after actuation of said movable member.

5. A braking system for vehicles comprising, in combination, a service fluid system and an auxiliary fluid system, a rotatable brake drum provided with an inner braking surface; a pair of spaced brake shoes each of which includes a braking surface frictionally engageable with said inner surface of said drum; a fluid actuated cylinder intermediate said brake shoes; at least three axially aligned pistons slideably carried in said cylinder, said pistons forming a plurality of motor chambers sealed one from the other; means connecting one end piston of said aligned plurality with one of said shoes; means connecting the other end piston of said aligned plurality with the other of said shoes; means for pressurizing fluid in the service fluid system which system includes one of said motor chambers, a fluid pressure translating means, and conduit means connecting said fluid pressure translating means with the said one of said motor chambers; actuating means for said fluid pressure translating means; said auxiliary fluid system including auxiliary fluid chamber; a second conduit means connecting said auxiliary fluid system with said second motor chamber; a member movably disposed in said auxiliary fluid chamber in communication with the fluid therein; and means operatively connected to said actuating means for applying force to said movable member to move said member in a direction to pressurize fluid in said auxiliary fluid chamber only in response to any failure of the first mentioned service brake fluid system to produce normal service brake operating pressure during operation of said actuating means in a direction to apply the service brake.

6. A braking system for vehicles comprising, in combination, a service fluid system and an auxiliary fluid system, movable means to be arrested by said system; shoe means forming a surface movable into frictional engagement with said first means; means including at least three pistons forming first and second fluid motors, said first fluid motor including a service motor chamber and an operative connection with said shoe means and said second fluid motor including an auxiliary motor chamber separate from said service motor chamber and an operative connection with said shoe means; means for pressurizing fluid in the service fluid system which system includes said service motor chamber, a fluid pressure translating means, and conduit means connecting said fluid pressure translating means with said service motor chamber; actuating means for said fluid pressure translating means; said auxiliary fluid system including an auxiliary fluid chamber; a second conduit means connecting said auxiliary fluid system with said auxiliary motor chamber; a member movably disposed in said auxiliary fluid chamber in communication with the fluid therein; and means operatively connected to said actuating means for applying force to said movable member to move said member in a direction to pressurize fluid in said auxiliary fluid chamber only in response to any failure of the first mentioned service brake fluid system to produce normal service brake operating pressure during operation of said actuating means in a direction to apply the service brake.

References Cited in the file of this patent

UNITED STATES PATENTS

| | | |
|---|---|---|
| 795,170 | Price | July 18, 1905 |
| 874,219 | Mahoney | Dec. 17, 1907 |
| 1,549,772 | Hukill | Aug. 18, 1925 |
| 1,650,286 | Livingston | Nov. 22, 1927 |
| 1,987,435 | Engel | Jan. 8, 1935 |
| 2,065,259 | Ball et al. | Dec. 22, 1936 |
| 2,195,558 | Bowen | Apr. 2, 1940 |
| 2,365,557 | Keith | Dec. 19, 1944 |
| 2,502,152 | Hudson | Mar. 28, 1950 |
| 2,539,538 | Hayes | Jan. 30, 1951 |
| 2,645,313 | Schaadt | July 14, 1953 |
| 2,649,169 | Holman | Aug. 18, 1953 |
| 2,665,777 | Joanis | Jan. 12, 1954 |
| 2,726,738 | Fawick | Dec. 13, 1955 |
| 2,816,626 | Fawick | Dec. 17, 1957 |

FOREIGN PATENTS

| | | |
|---|---|---|
| 779,383 | France | Jan. 14, 1935 |
| 9,404 | Great Britain | 1909 |